United States Patent [19]

Stephenson et al.

[11] Patent Number: 5,620,026
[45] Date of Patent: Apr. 15, 1997

[54] FLUID CONTROLLER AND IMPROVED BACKFLOW PREVENTION THEREFOR

[75] Inventors: Dwight B. Stephenson, Burnsville; Kenneth G. Rasmussen, Maple Grove, both of Minn.

[73] Assignee: Eaton Corporation, Cleveland, Ohio

[21] Appl. No.: 405,665

[22] Filed: Mar. 17, 1995

[51] Int. Cl.[6] .................................................... F15B 13/06
[52] U.S. Cl. ......................... 137/625.24; 60/384; 91/467; 91/516; 137/516
[58] Field of Search .............................. 60/384; 91/467, 91/516; 137/596.13, 625.24

[56] References Cited

U.S. PATENT DOCUMENTS

| | | | |
|---|---|---|---|
| 3,804,119 | 4/1974 | Christensen | 137/625.32 |
| 4,052,929 | 10/1977 | Baatrup | 91/29 |
| 4,505,110 | 3/1985 | Smith | 50/384 |
| 4,620,416 | 11/1986 | Yip et al. | 60/384 |
| 4,759,182 | 7/1988 | Haarstad | 137/596.13 X |

*Primary Examiner*—Gerald A. Michalsky
*Attorney, Agent, or Firm*—L. J. Kasper

[57] ABSTRACT

A fluid controller (17) is disclosed of the type including a relatively rotatable valve spool (95) and valve sleeve (97) which define a series of variable control orifices (71–76) during normal steering operations. Fluid flow to a control port (27) is controlled by a variable control orifice (74). During small steering corrections, at relatively small valve displacements, the present invention provides an additional variable control orifice (155), which opens before the control orifice (74) opens. A form of check valve (153) is in series with the additional orifice (155), and downstream thereof, to prevent reverse flow from the control port (27) through the controller. The invention is especially beneficial in controllers of the dynamic load signal type including a load signal drain orifice (76) which is open to the system reservoir (R) at the relatively small displacements.

12 Claims, 4 Drawing Sheets

FIG. 2

FLUID CONTROLLER AND IMPROVED BACKFLOW PREVENTION THEREFOR

BACKGROUND OF THE DISCLOSURE

The present invention relates to fluid controllers, and more particularly, to such controllers which are of the dynamic load signal type, and/or of the open-center type.

It will become apparent to those skilled in the art that the present invention may be used advantageously with various types and configurations of fluid controllers which are operable to control the flow of fluid from a source (such as a pump and load sensing priority valve) to a fluid pressure operated device (such as a vehicle steering cylinder). The invention is especially useful when applied to a fluid controller of the type in which the source of pressurized fluid communicates a dynamic load signal (as opposed to a "static" load signal) to the fluid controller, and the invention will be described in connection therewith. A dynamic load signal system of the type to which the present invention relates is illustrated and described in U.S. Pat. No. 4,620,416, assigned to the assignee of the present invention and incorporated herein by reference. However, the invention may also be used advantageously with an open-center controller, and that embodiment will also be described subsequently.

In a typical fluid controller of the type to which the present invention relates, there is a first flow path from an inlet port to a fluid meter and a second flow path from the meter to a first control port, which is connected to one side of the cylinder. The other side of the cylinder is connected to a second control port which is connected by a third flow path to a return port. The first and second flow paths define first and second variable flow control orifices, respectively, while the third flow path typically defines a third variable flow control orifice, although such is not essential to the present invention. These variable flow control orifices are generally referred to as the A1, the A4, and the A5 orifices, respectively, and will so be referenced sometimes hereinafter. In a typical fluid controller of the type used for full fluid-linked steering of an off-highway vehicle, the second variable orifice (A4) begins to open, and then subsequently, the first variable orifice (A1) begins to open. This phased opening of the control orifices is done partly to prevent the trapping of fluid within the controller.

In a controller of the dynamic signal Type, as disclosed in the above-cited patent, the dynamic signal is typically communicated to the first flow path, downstream of the first variable flow control orifice. The first flow path and the dynamic load signal path are in communication with the return port by means of a load signal drain orifice which, typically, is open when the valving is in its neutral position, and begins to close as the valving is displaced. In the dynamic load signal fluid controllers sold commercially by the assignee of the present invention, the variable load signal drain orifice remains open, and does not fully close, until after the first and second variable flow control orifices have begun to open.

Although dynamic load signal fluid controllers of the type described have been in commercial use and have been successful, an undesirable condition normally referred to as "drift" has been observed under certain operating conditions. It has been observed that, when the controller valving is being displaced only slightly, i.e., to make small steering corrections, the condition of the valving is as follows. The first variable flow control orifice is either closed or open very slightly, the second variable flow control orifice is open, and the load sense drain orifice is still open. In this condition, steering into a load results in reverse flow from the steering cylinder, through the second variable orifice, then through the fluid meter, then through the load sense drain orifice to the system reservoir. Such a reverse flow can result in a loss of registry between the position of the steering wheel anti the position of the steering cylinder and steered wheels, i.e., the steered wheels "drift" relative to the position of the steering wheel. This drift condition is especially likely if the rotary element of the fluid meter is unbalanced axially, such as by hydraulic forces and rubs against an adjacent housing member or end cap, resulting in drag on the rotatable member. When this occurs, it is possible to have leakage through the fluid meter, and past the rotatable member of the meter.

Another manifestation of such reverse flow is a phenomenon known as "wheel kick", in which the reverse flow through the fluid meter imposes a load on the rotatable member of the meter, with the load being transmitted mechanically back to the steering wheel, where it is felt by the vehicle operator as an undesirable, high force movement of the wheel in a direction opposite to the direction in which the operator is turning the wheel.

It has been observed that both drift and wheel kick occur only until the load sense drain orifice closes, thus shutting off the path for fluid to flow in a reverse direction. The drift and wheel kick have also been observed to occur only when the first variable flow control orifice is closed, or open very slightly, such that the fluid controller is not able to build sufficient pressure, downstream of the A1 orifice, to meet or exceed the load pressure. By definition, in a load sensing system, the inlet pressure should always be greater by a predetermined differential than the load pressure, but this is true, as a practical matter, only after the A1 orifice is open a sufficient amount to build pressure downstream thereof.

Similar phenomenon have been observed in open-center controllers in which there is a variable neutral orifice which gradually closes as the A1 orifice gradually opens, thus permitting the possibility of reverse flow through the neutral orifice, under conditions similar to those noted above.

SUMMARY OF THE INVENTION

Accordingly, it is an object of the present invention to provide an improved fluid controller which is capable of preventing reverse flow through an orifice, such as the load signal drain orifice, or the variable neutral orifice, to the system reservoir at relatively small valve displacements.

It is a more specific object of the present invention to provide an improved fluid controller which accomplishes the above-stated object without inhibiting or substantially changing the timing of the normal steering operation.

The above and other objects of the invention are accomplished by the provision of an improved fluid controller operable to control the flow of fluid from a source of pressurized fluid to a fluid pressure operated device. The controller is of the type including housing means including an inlet port for connection to the source, a return port for connection to a reservoir, first and second control fluid ports for connection to the fluid pressure operated device. Valve means is disposed in the housing means and defines a neutral position and at least one operating position. The controller includes means for imparting follow up movement to bias the valve means toward the neutral position in response to the flow of fluid to or from the fluid pressure operated device. The valve means cooperates with the housing means to define a first flow path communicating between the inlet port and the follow up means, a second flow path communicating between the follow up means and one of the control fluid ports, and a third flow path communicating between the other of the control fluid ports and the return port, the first, second and third flow paths including first, second and third variable flow control orifices, respectively, and having a gradually increasing flow area as the valve means is moved toward the operating position. The first variable orifice begins to open at a displacement X, and the second variable orifice begins to open at a displacement Y as the valve means moves from the neutral position toward the operating position, Y being greater than X.

The improved fluid controller is characterized by the valve means defining an additional second variable orifice disposed in a second fluid path, the additional second variable orifice begins to open at a displacement Y', the displacement Y' being less than the displacement X. The valves means includes means operable to prevent fluid flow through the additional second variable orifice unless the fluid pressure in the first flow path is greater than the fluid pressure in the first control fluid port, the flow prevention means being operable to prevent reverse fluid flow from the first control fluid port through the additional second variable orifice to the follow up means.

DESCRIPTION OF THE PREFERRED EMBODIMENT

Figure 1:
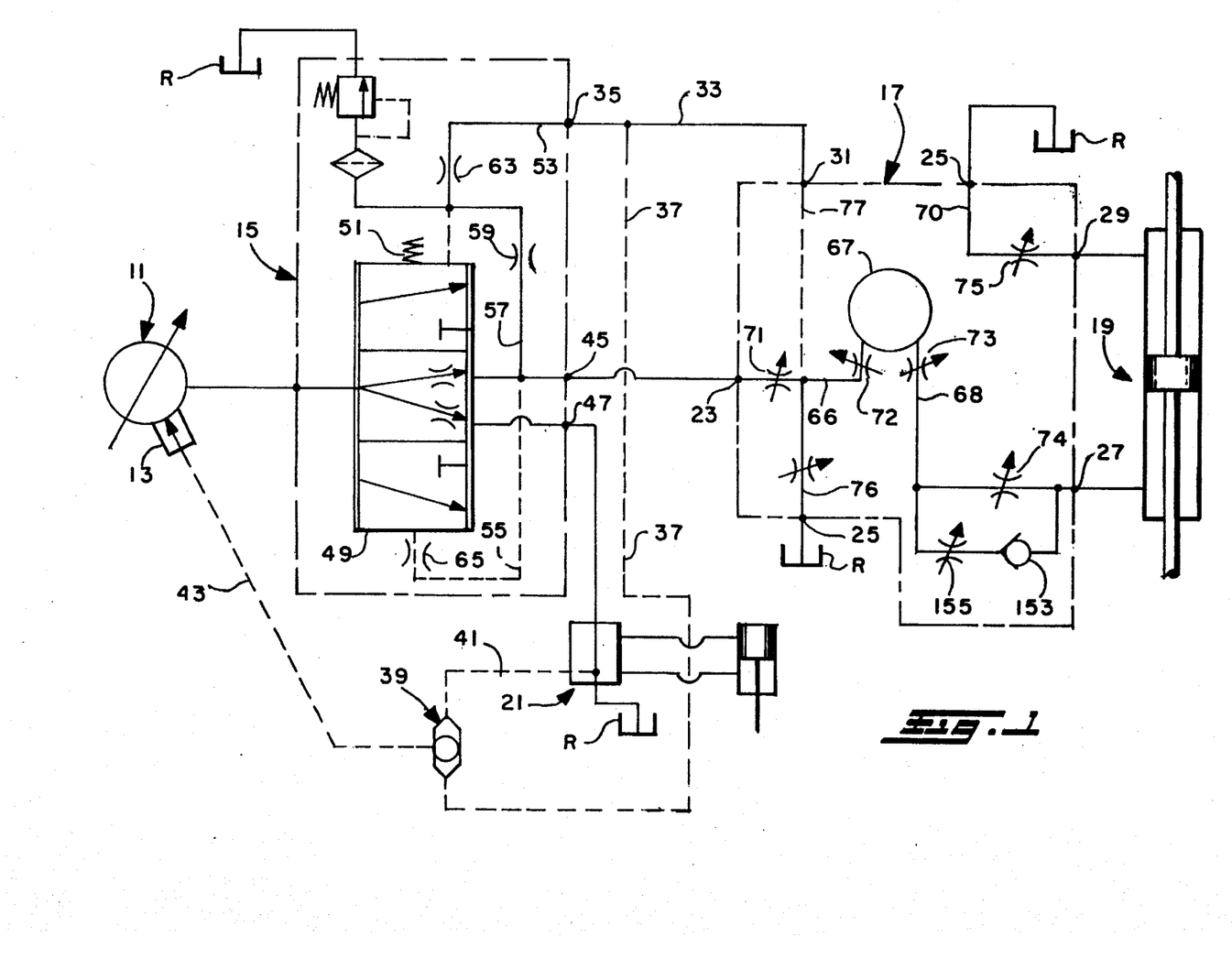
FIG. 1 is a hydraulic schematic of a dynamic load sensing, hydrostatic power steering system including one embodiment of the fluid controller of the present invention.

Referring now to the drawings, which are not intended to limit the invention, FIG. 1 is a schematic of a dynamic load signal vehicle hydrostatic steering system including a fluid controller made in accordance with the teachings of the present invention. The system includes a fluid pump 11, shown herein as including a load sensing displacement control mechanism 13. The system also includes a pilot operated, load sensing priority flow control valve (LSPV), generally designated 15. The LSPV 15 apportions the flow of fluid from the pump 11 between:

(1) a primary circuit including a fluid controller, generally designated 17, and a fluid operated steering cylinder 19; and (2) a load sensing auxiliary circuit, generally designated 21.

Referring still to FIG. 1, the fluid controller includes an inlet port 23, a return port 25, and a pair of control (cylinder) ports 27 and 29, which are connected to the opposite ends of the fluid motor (steering cylinder) 19. The controller 17 further includes a load signal port 31, which is connected to a load signal line 33, the line 33 also being connected to a signal port 35 of the LSPV 15. A signal line 37 has one end connected to the signal line 33, and its other end connected to one inlet of a shuttle valve 39. The other inlet of the shuttle valve 39 is connected to a load signal line 41 of the auxiliary load signal circuit 21. The outlet of the shuttle valve 39 is connected by a signal line 43 to the displacement control mechanism 13 of the pump 11, such that the mechanism 13 is always responsive to the higher of the two load pressure signals present in the signal lines 37 and 41.

The LSPV 15 may be of the type illustrated in U.S. Pat. Nos. 3,455,210 and 4,043,419, both of which are assigned to the assignee of the present invention, and are incorporated herein by reference. The LSPV 15 includes a priority outlet 45 which is connected to the inlet port 23 of the controller 17, and an excess flow outlet port 47, which is connected to the auxiliary circuit 21. The LSPV 15 includes a valve spool 49 which is biased by a compression spring 51 toward a position permitting substantially all inlet fluid to flow to the priority outlet port 45. The spring 51 is aided by the pressure in a signal line 53, communicating between the port 35 and the upper end (in FIG. 1) of the spool 49. In opposition to these biasing forces is the pressure exerted by a pilot signal 55, communicated from the priority outlet port 45 to the lower end (in FIG. 1) of the spool 49. The general structure and operation of the LSPV 15 are well known in the art, and because they form no part of the present invention, will not be described further herein.

In the subject embodiment of the present invention, the LSPV 15 is of the type which provides a "dynamic" load signal, i.e., one in which there is actual flow through the load signal line, rather than providing merely a "static" load signal, i.e., one in which there is normally no flow but only a static pressure. In order to accomplish the dynamic load signal, there is a flow path 57 interconnecting the priority outlet port 45 and the signal line 53, permitting a flow into the signal line 53. The dynamic signal flow is limited by a fixed orifice 59 in the flow path 57, and in addition, the signal lines 53 and 55 include damping orifices 63 and 65, respectively, to dampen variations in the opposing pressure signals acting on the spool 49.

The dynamic signal fluid controller 17 is illustrated and described in greater detail in above-incorporated U.S. Pat. No. 4,620,416. During the steering operation, the fluid controller 17 defines a fluid flow path 66 communicating between the inlet port 23 and a fluid meter 67, and a fluid flow path 68 communicating from the fluid meter 67 to the control fluid port 27. Fluid displaced by the cylinder 19 returns through the control port 29, then flows through a fluid flow path 70 to the return port 25. The flow path 66 includes a main variable flow control orifice 71, the A1 orifice, and a variable orifice 72, communicating with the inlet of the fluid meter 67. The outlet (metered fluid) of the meter 67 flows through a variable orifice 73 and a variable flow control orifice 74, the A4 orifice, defined by the flow path 68. The return flow path 70 includes a variable flow control orifice 75, the A5 orifice. The flow path 66 is also in communication with the return port 25 through a variable load signal drain orifice 76. The orifice 76 is in fluid communication with the load signal port 31, by means of a load signal circuit 77. The return port 25 is connected to a system reservoir R.

Figure 2:
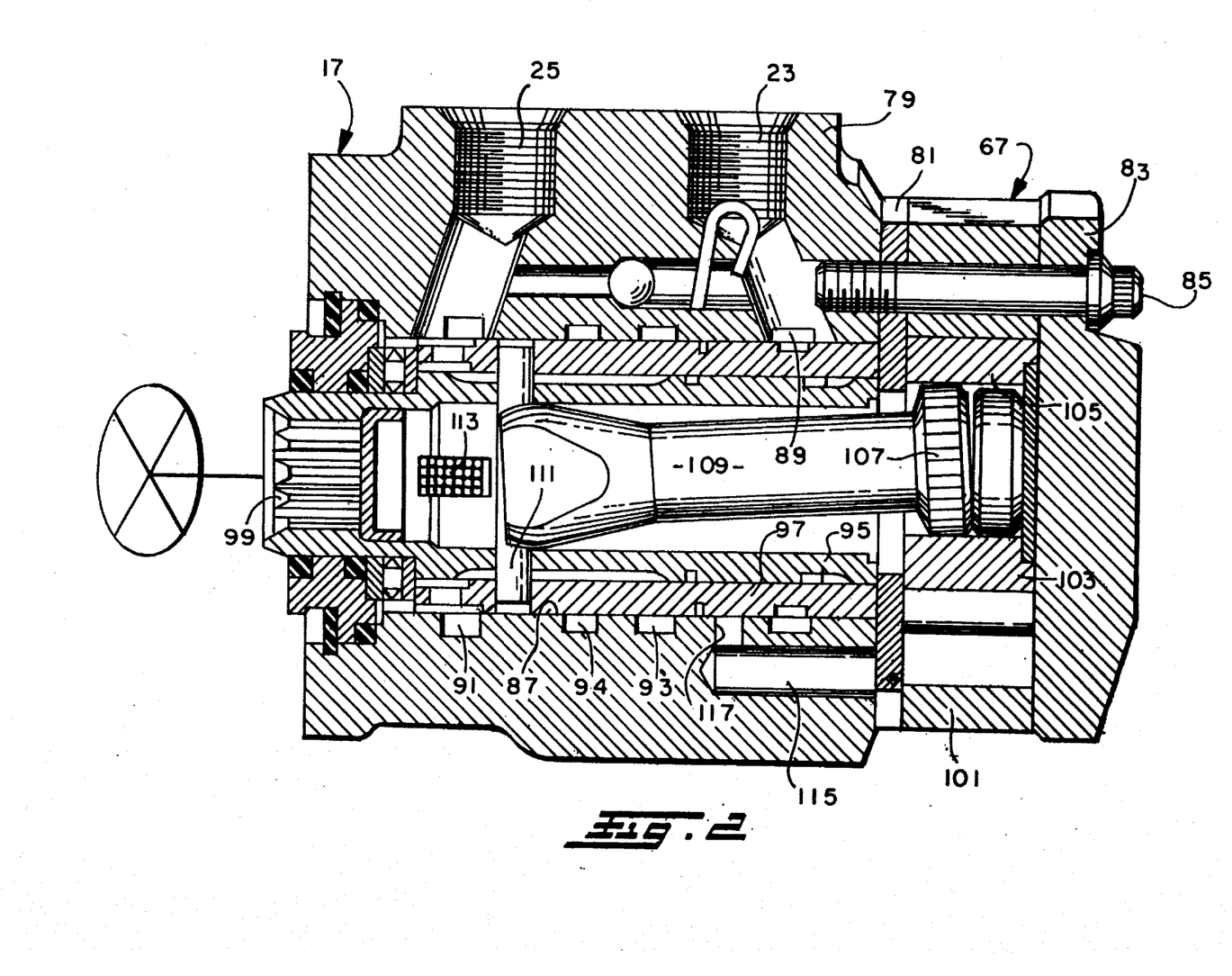
FIG. 2 is an axial cross-section of a fluid controller of the type to which the present invention relates.

Referring now primarily to FIG. 2, the fluid controller 17 will be described only briefly in view of the above incorporated patents. The controller 17 comprises several sections including a valve housing 79, a port plate 81, the fluid meter 67, and an end cap 83. These sections are held together in tight sealing engagement by means of a plurality of bolts 85, which are in threaded engagement with the valve housing 79, only one of the bolts 85 being shown in FIG. 2. The housing 79 defines the inlet port 23, the return port 25, and the control ports 27 and 29 (the ports 27 and 29 not being shown in FIG. 2). The valve housing 79 also defines the load signal port 31 (also not shown in FIG. 2). The housing 79 defines a cylindrical valve bore 87, an annular groove 89 communicating with the inlet port 23, an annular groove 91 communicating with the return port 25, and a pair of annular grooves 93 and 94 communicating with the control ports 27 and 29, respectively.

Rotatably disposed within the valve bore 87 is the controller valving, comprising a primary, rotatable valve member (spool) 95, and a cooperating, relatively rotatable follow up valve member (sleeve) 97. At the forward end of the spool 97 is a portion having a reduced diameter, and defining a set of internal splines 99 which provide for a direct mechanical connection with a steering wheel W. The spool 95 and sleeve 97 will be described in greater detail subsequently. The fluid meter 67 may be of any suitable construction, but in the subject embodiment, comprises a gerotor gear set including an internally toothed stator 101, and an externally toothed rotor 103. The rotor 103 defines a set of internal splines 105 and in splined engagement therewith is a set of external splines 107 formed on the rearward end of a drive shaft 109 which has a bifurcated forward end permitting a driving connection with the sleeve 97 by means of a drive pin 111. Pressurized fluid flowing through the valving in response to turning of the spool 95 flows to the fluid meter 67, causing orbital and rotational movement of the rotor 103 within the stator 101. Such movement of the rotor 103 causes follow up movement of the sleeve 97 by means of the drive shaft 109 and pin 111, to maintain an appropriate relative displacement between the spool 95 and sleeve 97, corresponding to a particular rate of rotation of the steering wheel W. When steering input is terminated, the rotor 103 returns the sleeve 97 to its neutral position, relative to the spool 95, blocking flow to or from the cylinder 19. A plurality of leaf springs 113, extending through openings in the spool 95 and sleeve 97, urges the sleeve toward the neutral position relative to the spool.

The valve housing 79 further defines a plurality of axially extending bores 115, each of which communicates through an opening in the port plate 81 with one of the expanding or contracting fluid volume chambers defined by the toothed interaction of the stator 101 and rotor 103. Communicating between each of the axial bores 115 and the valve bore 87 is a meter passage 117, which functions in association with the valving in a manner well known to those skilled in the art.

Figure 3:
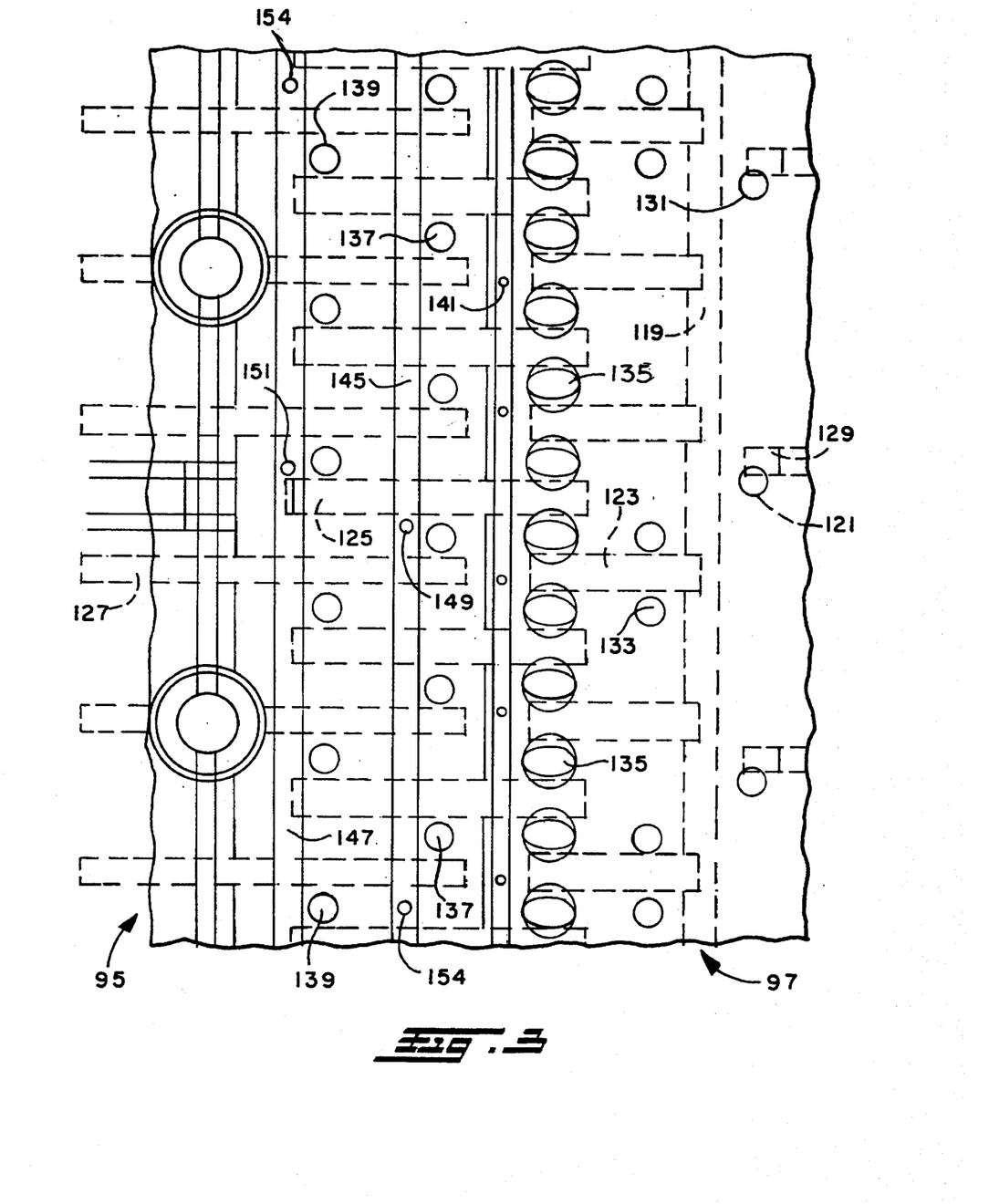
FIG. 3 is a fragmentary, overlay view of the valving used in the fluid controller of FIG. 2, but on a larger scale than FIG. 2, and with the valving being in its neutral position.

Referring now primarily to FIG. 3, there is shown in some detail the interface of the spool 95 and sleeve 97, at which the valve action occurs. For ease of illustration and understanding, elements of the sleeve 97 are shown by solid lines, and elements of the spool 95 are shown by dashed lines, except where visible through an opening in the sleeve 97 or except as noted hereinafter. In view of the above incorporation of U.S. Pat. No. 4,620,416, the construction details of the spool 95 and sleeve 97 will be described only briefly.

The valve spool 95 includes a circumferential groove 119, and a plurality of slots 121, extending axially to the right in FIG. 3, and communicating with the groove 119. Also communicating with the groove 119 is a plurality of slots 123, extending axially to the left in FIG. 3. Valve spool 95 also defines a plurality of axial slots 125, and a plurality of axial slots 127. Disposed adjacent each of the slots 121 is a drain opening 129, which is in open communication with the system reservoir R through the interior of the valve spool 95.

The valve sleeve 97 defines at least one drain port 131, and a plurality of supply ports 133 which are in continuous communication with the inlet port 23. Disposed to the left of the supply ports 133 is a plurality of meter ports 135 which are connected, alternately, to the expanding volume chambers and the contracting volume chambers of the fluid meter 67, by means of commutator action with the meter passages 117, as is well known in the art. The valve sleeve 97 also defines a plurality of cylinder ports 137 which are in fluid communication with the control fluid port 27, and a plurality of cylinder ports 139 which are in fluid communication with the control fluid port 29.

The valve sleeve 97 further defines at least a pair of load sensing ports 141, which are in fluid communication with the load signal port 31. Finally, the valve sleeve 97 defines a plurality of return ports (not shown), which are in continuous fluid communication with the return port 25.

Referring now to FIG. 3, in conjunction with FIG. 1, the variable orifices 71 through 76 shown schematically in FIG. 1 will be described briefly in terms of the spool-sleeve structure of FIG. 3. When the spool 95 and the sleeve 97 are in their relative neutral position, each of the drain ports 131 is in communication with both the adjacent axial slot 121 and the adjacent drain opening 129, to permit flow from the load sensing circuit through the load sensing ports 141, then through the axial slots 123 and slots 121. The flow area defined by the overlap of the drain port 131 and the slot 121 and opening 129 comprises the load signal drain orifice 76. As the spool 95 and sleeve 97 are displaced from the neutral position toward an operating position shown in FIG. 5, the flow area of the drain orifice 76 decreases.

Figure 5:
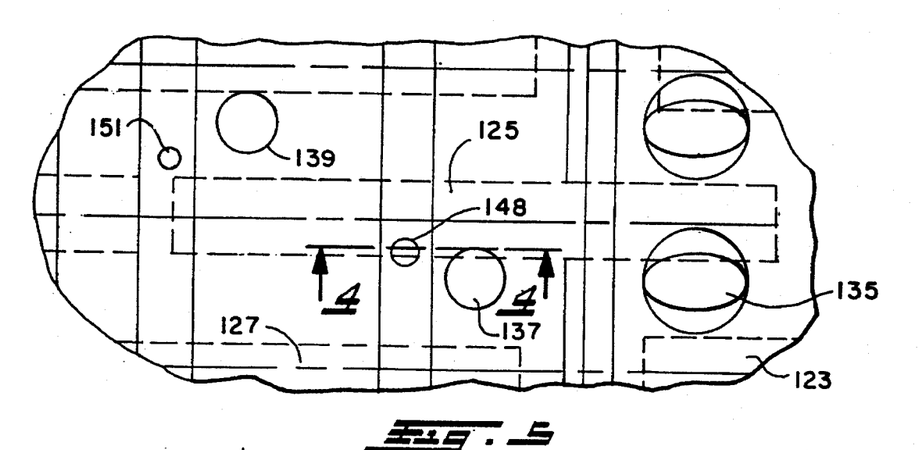
FIG. 5 is a further enlarged, fragmentary overlay view, similar to FIG. 3, but illustrating the valving displaced from the neutral position.

As the spool and sleeve are rotated, various other ports and slots eventually begin to communicate to define the variable orifices 71 through 75, all of which are opposite the drain orifice 76, in that the variable orifices 71 through 75 have a zero flow area when the spool and sleeve are in neutral, then begin to open when the spool and sleeve are in transition from the neutral position to the operating position shown in FIG. 5. The main flow control orifice 71 is defined by the overlap between the supply ports 133 and the adjacent axial slots 123. The variable orifice 72 is defined by the overlap of alternate meter ports 135 and the axial slots 123, while the variable orifice 73 is defined by the overlap of the remainder of the meter ports 135 and the axial slots 125. The variable orifice 74 is defined by the overlap of the cylinder ports 137 and the axial slots 125, while the variable orifice 75 is defined by the overlap of the cylinder ports 139 and the axial slots 127. It should be noted in FIG. 3 that the axial slots 127 are in relatively unrestricted fluid communication with the return ports over the entire range of relative displacement of the spool and sleeve.

In operation, if the spool were displaced in a downward direction in FIG. 3, relative to the spool 97, pressurized fluid entering the inlet port 23 would flow through the supply ports 133, filling the axial slots 123, then flowing through the meter ports 135 to the expanding volume chambers of the fluid meter 67. Metered fluid would then flow from the contracting volume chambers of the fluid meter 67, through the alternate meter ports 135 into the axial slots 125. Metered fluid in the slots 125 would then flow through the cylinder ports 137 to the control port 27, and fluid exhausted from the cylinder 19 would return to the control port 29, and then to the cylinder ports 139 and then to the axial slots 127. Returned fluid in the slots 127 would then flow through the return ports to the return port 25, and then to the system reservoir R.

In a standard, static load signal fluid controller, fluid pressure in the axial slots 123 would be "transmitted" through the load sensing ports 141 to the load signal port 31. However, because the system shown in FIG. 1 operates on a dynamic load signal, fluid is pumped from the priority outlet port 45 through the flow path 57 and orifices 59 and 63 to the signal port 35. From the port 35, dynamic signal fluid is pumped through the signal line 33 to the load signal port 31, and from their through the load sensing ports 141 into the axial slots 123, thus "recombining" with the "main flow path" (i.e, the flow path 66 plus the flow path 68). However, it will be understood by those skilled in the art that the fluid pressure at any point in the load signal path just described is representative of the instantaneous steering load (pressure on the cylinder 19) in the same manner as in the case of a static load signal. It should be noted that everything described up to this point is already in commercial use, and therefore, generally well known. That which is novel, in accordance with the present invention will be described subsequently.

Referring now to FIG. 3, in conjunction with FIG. 5, the valve sleeve 97 further defines an annular groove 145 which is disposed adjacent the cylinder ports 137, and an annular groove 147 which is disposed adjacent the cylinder ports 139. The grooves 145 and 147 are formed on the outer surface of the valve sleeve 97, but are illustrated in FIG. 3 as an exception to the general rule of showing only the interface between the spool 95 and sleeve 97, to facilitate an understanding of the present invention.

Figure 4:
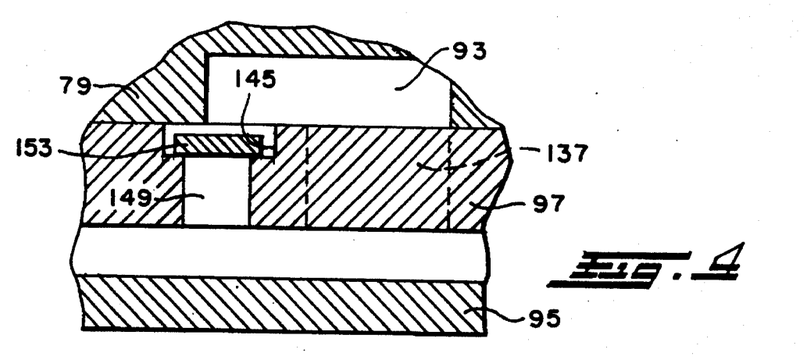
FIG. 4 is a further enlarged, fragmentary, axial cross-section, taken on line 4—4 of FIG. 5.

Disposed in the annular groove 145 is an additional cylinder port 149, and disposed within the annular groove 147 is an additional cylinder port 151. Each of the additional cylinder ports 149 and 151 extends from the inner cylindrical surface of the valve sleeve 97 and opens into its respective annular groove. Referring now primarily to FIG. 4, the annular groove 145 and additional cylinder port 149 are shown, in somewhat greater detail, and on a larger scale for clarity of illustration. Also shown in FIG. 4, but omitted from FIG. 3 for clarity, is an annular seal ring member 153 which is received within the annular groove 145, and is sized and configured to fit close to the bottom annular surface of the groove 145, in the absence of any fluid pressure forces acting thereon. It should be understood that a similar seal ring member would be disposed in the annular groove 147, but because both arrangements are substantially identical, only the one arrangement will be described in detail.

Referring still primarily to FIG. 4, the annular seal ring member 153 is slightly wider than the diameter of the additional cylinder port 149, but is narrower than the annular groove 145. For ease of assembly, the seal ring member 153 is preferably not literally a ring, but instead is discontinuous over perhaps five or ten degrees of its annular extent. Disposed in each of the annular grooves 145 and 147 is a small roll pin 154, or other similar structure, oriented generally radially, but not extending radially outward beyond the outer surface of the valve sleeve 97. The roll pin is disposed between the opposite "ends" of the seal ring member 153, to limit rotation thereof, so that the opening between the ends can never become circumferentially aligned with the port 149, which would prevent the member 153 from serving its intended purpose, as will become apparent subsequently.

The seal ring member 153 may be made from a high strength plastic material, or from a carbon fiber material or may comprise a steel ring member. The material of the ring member 153 is not an essential feature of the present invention, as long as the ring member is able to perform the function to be described subsequently.

Referring now to FIGS. 3 and 5, in conjunction with FIG. 1, it will be assumed that the vehicle operator wishes to make a right turn, i.e., the valve spool 95 will move downward in FIGS. 3 and 5, relative to the valve sleeve 97. As may best be seen in FIG. 5, as the spool 95 begins to move, and before the cylinder ports 137 begin to overlap the axial slots 125, to open the variable flow control orifice 74, the additional cylinder port 149 will begin to communicate with the axial slot 125, the overlap therebetween comprising an additional variable flow control orifice 155.

The seal ring member 153, disposed in the annular groove 145, serves the function of a check valve, relative to the additional variable orifice 155, and therefore, the seal ring member 153 is represented schematically in FIG. 1 as a check valve, downstream from the orifice 155, and in series therewith. Within the scope of the present invention, the seal ring member 153 could be replaced by a conventional ball check valve if the valve sleeve 97 were thick enough to provide the space required for a conventional ball check valve. However, in the subject embodiment, the radial thickness of the valve sleeve 97 is such that the annular seal ring member 153 is utilized instead. Those skilled in the art will understand from a reading of the subsequent description of the present invention that the function of the seal ring member 153, or whatever other structure is used, is twofold. The first function is to prevent fluid flow through the additional variable orifice 155 except when the fluid pressure in the fluid flow path 68, upstream of the orifice 155, is greater than the fluid pressure at the control fluid port 27. The second function is to prevent reverse fluid flow from the port 27 through the additional variable orifice 155, and then back through the fluid meter 67, as was described previously, whenever the fluid pressure at the port 27 is greater than the fluid pressure upstream of the orifice 155.

Although the variable flow control orifice 74 and the additional variable orifice 155 are illustrated in FIG. 1, schematically, as being in parallel, and at various times they are in parallel, it is necessary, in order to appreciate the present invention, to understand the phasing or timing of the various orifices 71–76 and 155. It is also important to appreciate, as is generally understood in the art, that the load imposed on the cylinder 19 will have an effect upon the displacement between the spool 95 and sleeve 97 at which the additional variable orifice 155 begins to open.

In general, the operation of the fluid controller 17, including the present invention, will differ little, if any, from the operation of the prior art fluid controller when the vehicle operator is rotating the steering wheel at a rate which corresponds to a substantial opening of the controller valving. By way of example only, in the subject embodiment, maximum displacement of the spool 95 and sleeve 97 occurs at about 15 degrees of relative rotation, which may correspond approximately to a rate of rotation of the steering wheel of about 30 rpm. Therefore, when the steering wheel is being rotated at a rate of about 10 rpm, the relative displacement of the spool 95 and sleeve 97 would be about 5 degrees. Whenever the displacement of the valving is in the range of 5 degrees to 15 degrees, in the subject embodiment, the operation of the fluid controller would be substantially unaffected by the present invention, and therefore, the following description of the operation of the present invention will be limited to relatively slow rotation of the steering wheel, and relatively small displacements of the valving.

Whenever the vehicle operator is turning the steering wheel slowly, and making relatively small steering corrections, the spool 95 and sleeve 97 are displaced, rotationally, by a very small amount. Those skilled in the art will understand that such small valve displacements do not require a corresponding amount of displacement of the steering wheel, but instead, are achieved as a result of a relatively slow rotation of the steering wheel, such that the follow up action of the fluid meter 67, etc., maintains the relatively small (e.g., two or three degrees) displacement of the valving. At such small displacements, steering into a load can result in a higher pressure at the control port 27 than exists in the flow paths 66 and 68, because the main orifice 71 is not yet open, or is open only slightly. As a result, and as was described in the BACKGROUND OF THE DISCLOSURE, there will be a reverse flow from the port 27 through the fluid path 68, and through the fluid meter 67, then through the load signal drain orifice 76 to the system reservoir, causing either "drift" or "wheel kick", both of which are extremely undesirable conditions.

In order to describe the function and benefits of the present invention, the operation of the valving will be described, assuming that the spool 95 and sleeve 97 are gradually displaced from the neutral position shown in FIG. 3 toward the operating position shown in FIG. 5.

Figure 6:
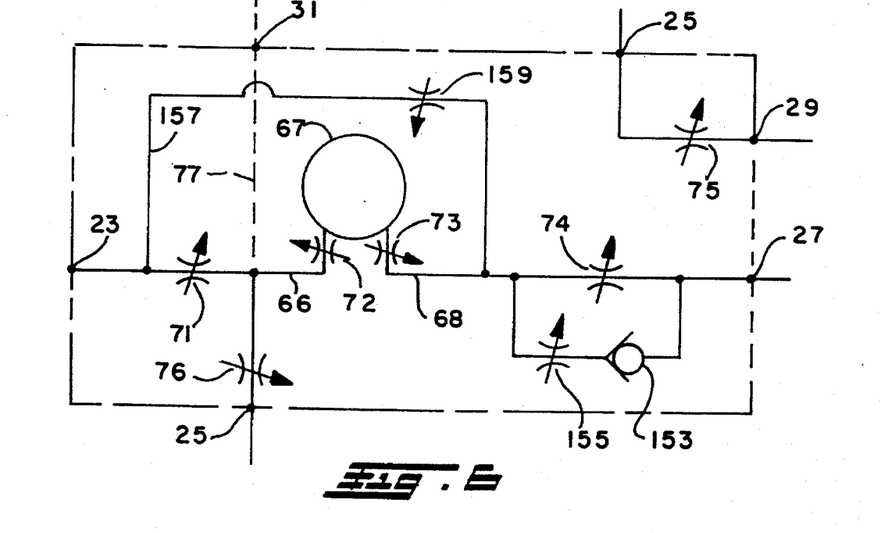
FIG. 6 is a partial hydraulic schematic, similar to FIG. 1, illustrating the present invention being utilized in a fluid controller of the type having flow amplification capability.

Furthermore, the detailed description of the operation of the invention will be made with regard to an alternative embodiment, shown schematically in FIG. 6, of the fluid controller. In the embodiment of FIG. 6, all elements present in the FIG. 1 embodiment bear the same reference numerals as in FIG. 1, but added elements bear reference numerals in excess of "155".

The controller shown schematically in FIG. 6 is made in accordance with the teachings of U.S. Pat. No. 4,759,182, which is assigned to the assignee of the present invention and incorporated herein by reference. Briefly, the controller of FIG. 6 includes an amplification flow path 157 which bypasses the fluid meter 67. The flow path 157 is connected to the main fluid path (flow path 66 plus flow path 68) at a point upstream of the variable orifice 71, then reconnects with the main flow path downstream of the variable orifice 73. Fluid controllers of this type are now in commercial use and are generally well known to those skilled in the art. The flow path 157 includes a variable amplification orifice 159 which is typically defined at the interface of the spool 95 and sleeve 97, and therefore, the area of the variable orifice 159 is a function of the displacement of the spool and sleeve.

As the operator turns the wheel, the spool 95 is displaced from its neutral position, relative to the sleeve 97, and the load signal drain orifice 76, which has its maximum flow area at neutral, begins to decrease gradually. At this point, the only flow into the controller is the dynamic signal fluid entering the load signal circuit 77 and connected to the flow path 66. As the spool is displaced, the first orifice which opens is the additional variable orifice 155, followed soon thereafter by the variable orifices 72 and 73, which typically open at the same displacement. If the fluid pressure in the flow paths 66 and 68, upstream of the orifice 155, is not sufficient to support the load at the port 27, the seal ring member (check valve) 153 prevents any reverse flow of the type described previously.

The next orifice which begins to open is the variable flow control orifice 75, the A5 orifice, so that there is no trapping of fluid pressure on the contracting side of the cylinder 19. Next, the variable amplification orifice 159 begins to open, permitting fluid to flow from the inlet port 23 through the amplification flow path 157, bypassing the meter 67, then flowing to the flow path 68. At this particular valve displacement, all flow through the amplification flow path 157 must still flow through the additional variable orifice 155, and past the check valve 153 in order to reach the control port 27, and therefore, there can be no reverse flow through the amplification path 157, which is one important aspect of the present invention. As a result, it is possible to design the valving to open the amplification orifice 159 before opening the main variable orifice 71, and it has been determined that such phasing is important in trying to achieve a fairly constant amplification ratio (i.e., ratio of total flow from the port 27 to the flow through the orifice 71), especially at relatively lower wheel rotation rates.

After some additional rotation of the spool 95 relative to the sleeve 97, the load signal drain orifice 76 closes, thus shutting off the path to the system reservoir for dynamic signal fluid entering the controller at the port 31 and flowing through the load signal circuit 77 to the flow path 66. Very soon thereafter, the main variable flow control orifice 71, the A1 orifice, begins to open, with the flow through the orifice 71 combining with the dynamic signal fluid in the circuit 77. At this displacement, all fluid in the flow path 68 must still flow through the additional variable orifice 155 so that there can still not be any reverse flow from the port 27, if the operator is steering into a load. Although the main orifice 71 is now open slightly, there still may not be sufficient pressure to meet and support the load at the port 27, and although the drain orifice 76 is now closed such that reverse flow through the orifice 76 to the reservoir is no longer possible, there could still be reverse flow of the type imposing a load on the fluid meter 67 and causing wheel kick.

Finally, only after all of the orifices described above are open far enough to function somewhat normally, the variable flow control orifice 74, the A4 orifice, begins to open, thus providing for flow of metered fluid through the flow path 68, then through the orifice 74 to the control port 27. As will be understood by those skilled in the art, once the orifice 74 is open, there is also the theoretical possibility of reverse flow, but at this particular displacement, it is almost certain that sufficient pressure has built up to support any load pressure which may be present at the port 27. In order to obtain the full benefit of the present invention, it will be apparent to those skilled in the art that the variable flow control orifice 74 should not open until after the load signal drain orifice 76 has closed, i.e., all of the flow to the control port 27 is past the check valve 153 until after the drain orifice 76 is closed. Although the "checked" additional orifice 155 is required only at the relatively small displacements, it may remain open through a major portion of, or even all of, the displacement of the valving without interfering in any way with the valving function. However, once the variable orifice 74 begins to open, the additional orifice 155 becomes largely irrelevant.

As was mentioned in the BACKGROUND OF THE DISCLOSURE, the present invention may also be used in an open-center controller of the type which is well known to those skilled in the art. For purposes of the invention, the operation of an open-center controller is really quite similar to the dynamic load signal device of the main embodiment. An open-center controller includes a variable neutral orifice, which has its maximum orifice area when the valving is in neutral, and a decreasing flow area as the valving begins to be displaced toward an operating position. As the variable neutral orifice is closing, pressure begins to build in the main fluid path, in a manner similar to the main embodiment. Therefore, in an open-center controller having the present invention, only the additional variable flow control orifice, but not the A4 orifice, should be open until after the variable neutral orifice closes. Once the variable neutral orifice closes, there is not likely to be any reverse flow through the controller, or any wheel kick or drift. Then, after the variable neutral orifice is closed, the regular A4 orifice begins to open, but by this time there should be sufficient pressure built-up in the main fluid path to meet and support the load on the steering cylinder.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fluid controller operable to control the flow of fluid from a source of pressurized fluid to a fluid pressure operated device, the controller being of the type including housing means including an inlet port for connection to the source of fluid, a return port for connection to a reservoir, first and second control fluid ports for connection to the fluid pressure operated device, valve means disposed in said housing means and defining a neutral position (FIG. 3) and at least one operating position (FIG. 5); means for imparting follow up movement to bias said valve means toward said neutral position in response to the flow of fluid to or from the fluid pressure operated device; said valve means cooperating with said housing means to define a first flow path communicating between said inlet port and said follow up means, a second flow path communicating between said follow up means and one of said control fluid ports, and a third flow path communicating between the other of said control fluid ports and said return port, said first, second, and third flow paths including first, second, and third variable flow control orifices, respectively, having a gradually increasing flow area as said valve means is moved towards said operating position (FIG. 5); said first variable orifice begins to open at a displacement X, and said second variable orifice begins to open at a displacement Y as said valve means moves from said neutral position toward said operating position, Y being greater than X; characterized by:

(a) said valve means defines an additional second variable orifice disposed in said second fluid path, said additional second variable orifice begins to open at a displacement Y', said displacement Y' being less than said displacement X; and (b) said valve means including means operable to prevent fluid flow through said additional second variable orifice unless the fluid pressure in said first flow path is greater than the fluid pressure in said first control fluid port, said flow prevention means being operable to prevent reverse fluid flow from said first control fluid port through said additional second variable orifice to said follow up means.

2. A fluid controller as claimed in claim 1, characterized by the source of fluid including pressure responsive means for varying the delivery of fluid to the controller; and a load signal port for connection to the pressure responsive means; said valve means defining a load signal circuit operable to communicate to said load signal port a fluid pressure representative of the load on the fluid pressure operated device; said valve means and said housing means cooperating to define a drain flow path communicating between said load signal circuit and said return port and including a variable drain orifice having a maximum flow area when said valve means is in said neutral position (FIG. 3) and progressively decreasing to a zero flow area as said valve means moves toward said operating position (FIG. 5).

3. A fluid controller as claimed in claim 2, characterized by said variable drain orifice achieves a zero flow area at a displacement Z of said valve means, said displacement Z being approximately the same as said displacement X.

4. A fluid controller as claimed in claim 3, characterized by the source of pressurized fluid including means operable to communicate dynamic load signal fluid into said load signal circuit.

5. A fluid controller as claimed in claim 1, characterized by said valve means and said housing means cooperating to define an amplification fluid path, said amplification fluid path being in fluid communication with said first flow path at a location disposed between said fluid inlet port and said first variable flow control orifice, and with said second flow path at a location disposed between said follow up means and said first control fluid port.

6. A fluid controller as claimed in claim 5, characterized by said amplification fluid path including a variable amplification orifice having its minimum flow area when said valve means is in said neutral position (FIG. 3), and an increasing flow area as said valve means is displaced from said neutral position toward said operating position (FIG. 5).

7. A fluid controller as claimed in claim 6, characterized by said variable amplification orifice begins to open at a displacement less than said displacement X as said valve means moves from said neutral position (FIG. 3) toward said operating position (FIG. 5).

8. A fluid controller s claimed in claim 1, characterized by said valve means comprising a primary, rotatable valve member and a cooperating, relatively rotatable valve member, said primary and follow up valve members defining said neutral position (FIG. 3) relative to each other.

9. A fluid controller as claimed in claim 8, characterized by said primary and said follow up valve members cooperating to define said first and said second variable flow control orifices, the flow area of said first and second variable orifices varying in response to relative rotation of said primary and said follow up valve members.

10. A fluid controller as claimed in claim 8, characterized by said follow up means comprising a fluid meter including a metering member moveable to measure the volume of fluid flowing through said first and second flow paths, said controller further comprising means coupling said metering member to said follow up valve member.

11. A fluid controller as claimed in claim 1, characterized by said housing means and said valve means cooperating to define a variable drain orifice communicating between said first flow path and said return port, said variable drain orifice having its maximum flow area when said valve means is in said neutral position (FIG. 3), and a progressively decreasing flow area as said valve means moves toward said operating position (FIG. 5).

12. A fluid controller as claimed in claim 11, characterized by said variable drain orifice achieves a zero flow area at a displacement Z of said valve means, said displacement Z being greater than said displacement Y' at which said additional second variable orifice begins to open, but less than said displacement Y at which said second variable orifice begins to open.

* * * * *